March 10, 1964 W. MELAS 3,124,000
SEWAGE OPEN FLOW METER
Filed Nov. 1, 1957 4 Sheets-Sheet 1

INVENTOR.
William Melas
BY
Jones, Darbo & Robertson
Attys.

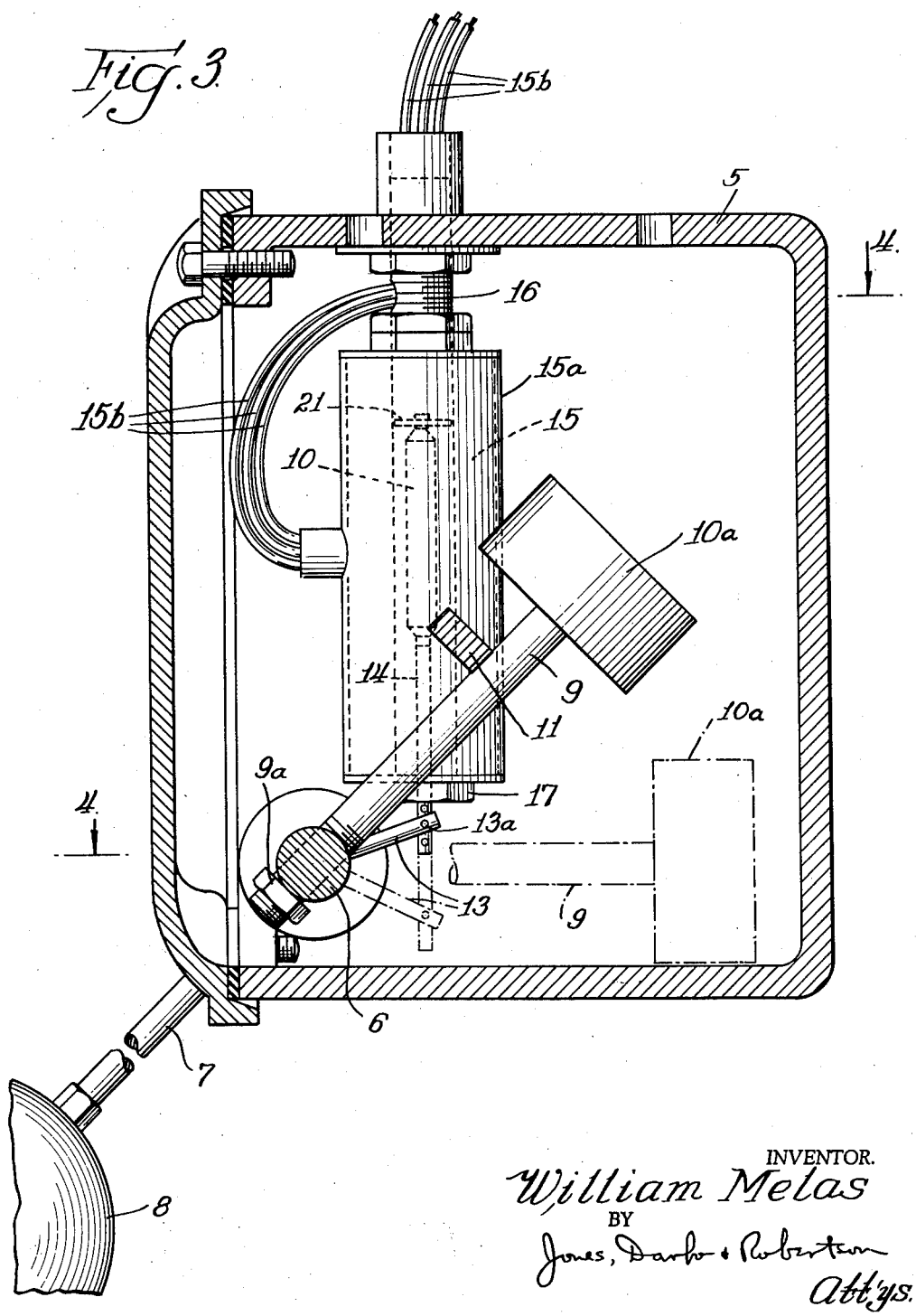

March 10, 1964

W. MELAS 3,124,000

SEWAGE OPEN FLOW METER

Filed Nov. 1, 1957

INVENTOR.
William Melas
BY
Jones, Darbo & Robertson
Att'ys.

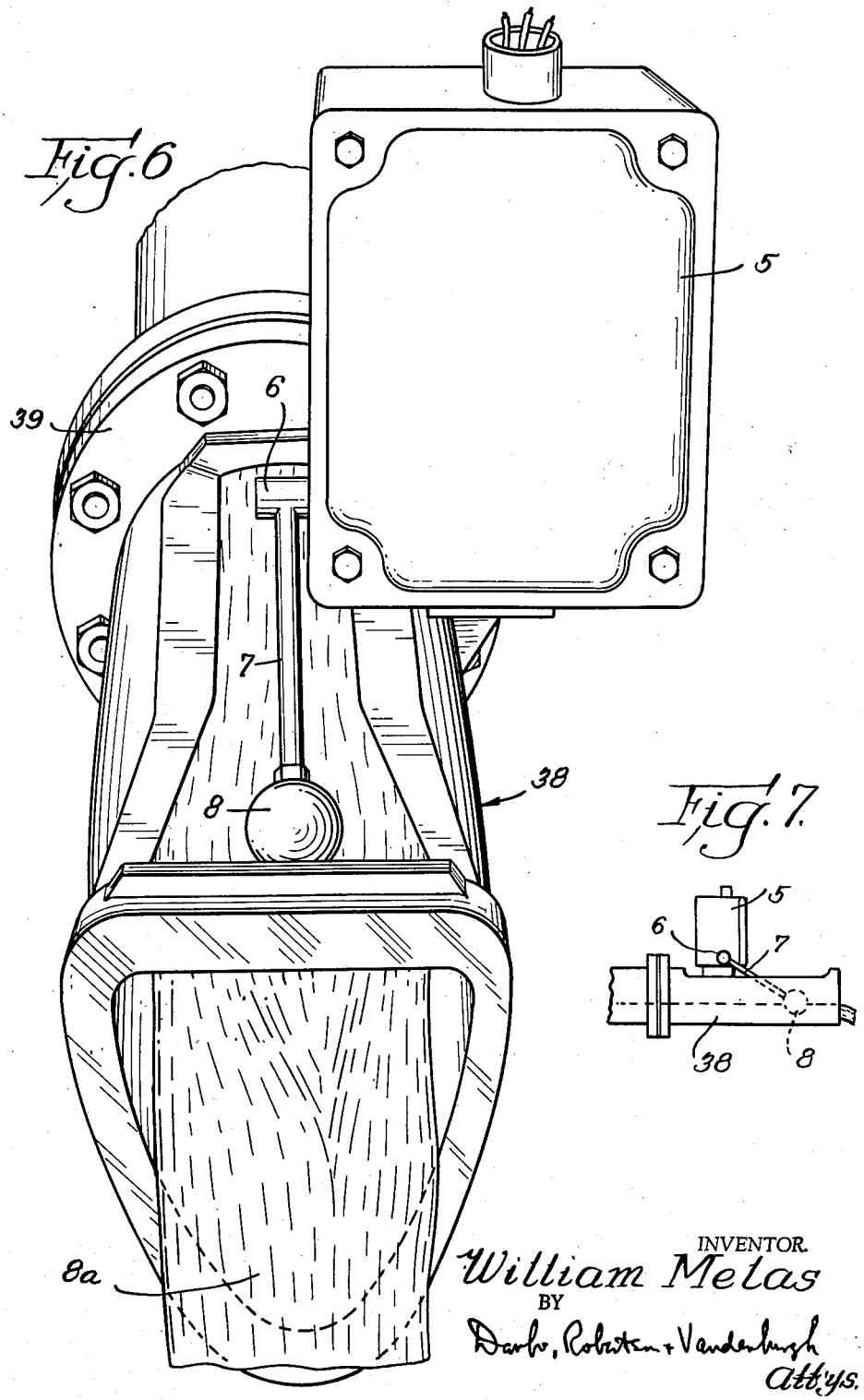

United States Patent Office 3,124,000
Patented Mar. 10, 1964

3,124,000
SEWAGE OPEN FLOW METER
William Melas, Philadelphia, Pa., assignor, by mesne assignments, to Penn Meter Company, Philadelphia, Pa., a corporation of Pennsylvania
Filed Nov. 1, 1957, Ser. No. 693,835
10 Claims. (Cl. 73—215)

This invention relates to the measurement of the rate of flow of liquids and more particularly refers to apparatus for sensing and transmitting an electrical signal for indicating the rate of flow of water or sewage through open flow measuring devices, such as flumes, and open flow nozzles.

The measurement of flow of water under free flowing conditions through open channels, sewers or partially filled pipes is commonly accomplished by means of weirs or flumes. The rate of flow of water through such devices is a function of the depth or head of the water upstream from the weir or throat of the flume. Any suitable means, such as a measuring stick, may be used to measure the head of water and the rate of flow calculated from this information, or the scale on the measuring stick may be a direct indication of the rate of flow.

When it is desired to use a float to automatically and continuously sense the level of the surface of the water for the purpose of continuously indicating the rate of flow of the water through the weir or flume, the general practice has been to provide a stilling well adjacent the flume but connected to the flow channel at the level of the bottom of the flume or weir notch so that the level of the still water in the well is the same as that upstream from the flume or weir so that the level of the water in the stilling well indicates the rate of flow through the measuring device. A float resting upon the surface of the water in the stilling well, not being subjected to the horizontal movement of the flowing stream of water, may then be connected to suitable mechanisms which indicate the rate of flow or transmit an electrical signal responsive to the level of the float.

Although heretofore almost universally employed, the stilling well expedient has the inherent disadvantages of substantial construction and maintenance costs and additional space requirements. When metering sediment-bearing water, and particularly sewage, it is necessary to provide means for periodically flushing out the stilling well with clean water. This equipment and necessary maintenance further increase the cost of building and operating the stilling well.

The principal object of the invention is to provide an apparatus for measuring the rate of flow of water in open flow measuring systems which apparatus is simple, accurate over long periods of use, and inexpensive to install and operate. A novel feature of the apparatus resides in the fact that it measures the level of the flowing stream of water directly in the stream and without the interposition of a stilling well.

A further object of the the invention is to provide continuously operating measuring apparatus which is not adversely affected by the presence of floating debris in the water. Another object is to provide such measuring apparatus which can readily be adapted for the measurement of the rate of flow of water over a very wide range. Still another object is to provide such apparatus which provides an electrical signal suitable for use in telemetering systems. Other objects and advantages of the invention will become apparent from the following detailed description thereof in conjunction with the accompanying drawings wherein—

FIG. 3 is an enlarged vertical sectional view of the sensing and transmitting apparatus taken at the lines 3—3 of FIGS. 1 and 4;

FIG. 6 is a perspective view of the measuring apparatus using an open flow nozzle, and FIG. 7 is a side view of the assembly of FIG. 6 on a much smaller scale.

Figure 1:
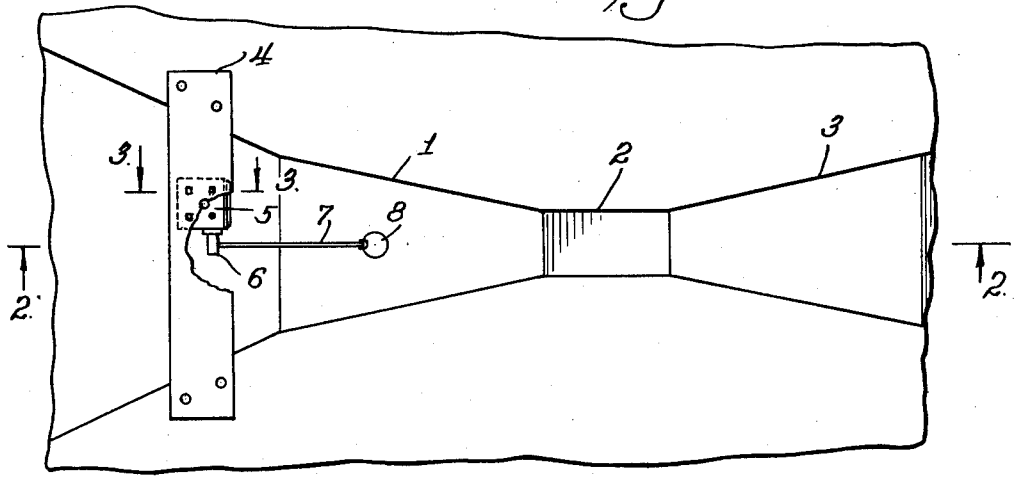
FIG. 1 is a plan view of a Parshall flume showing the measuring apparatus of the present invention mounted thereon.

Referring to FIG. 1, a Parshall flume is shown by way of example of a suitable channel-type open flow measuring device. As used herein, the term "channel-type open flow measuring device" means a flow measuring device wherein the flowing sewage is conducted through an open flume, such as a Parshall flume or open flow nozzle, wherein the entire body of sewage flows continuously as a stream and the level of the sewage for flow measurement purposes is measured by sensing the level of the stream at an appropriate point as it flows through the open flume. This Parshall flume, shown by way of example, has a converging section 1, a throat section 2, and a diverging section 3. A beam 4 is mounted across the top of the entrance to the flume and fastened at each end to the flume walls and a housing 5 containing the measuring mechanism is mounted thereunder, supported by the beam. A spherical float 8 is fastened to the free end of a float arm 7 which is connected to a pivot shaft 6 mounted in housing 5.

Figure 2:
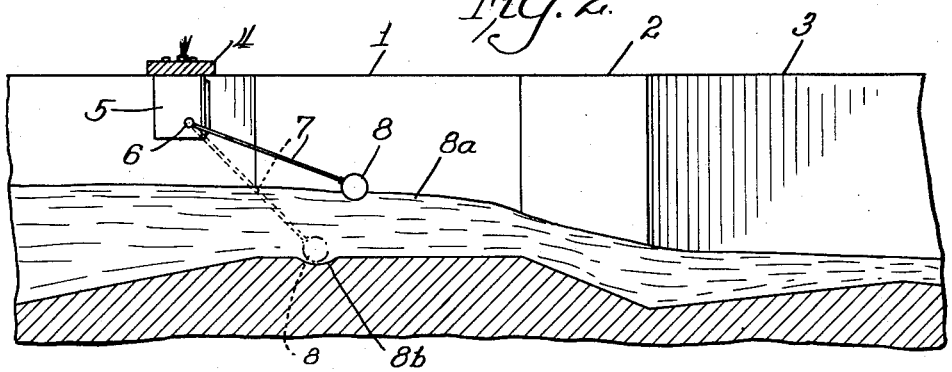
FIG. 2 is a vertical sectional view of the flume and measuring apparatus shown in FIG. 1 and taken at the line 2—2 thereof.

As is shown in FIGS. 1 and 2, the measuring apparatus is oriented with the float 8 downstream from the pivot 6 of the float arm, the float being located approximately at the crest of the stream of water 8a for properly sensing the level of the water in the flume. Desirably, a small depression 8b is provided in the bottom of the flume to accommodate float 8 for zero flow calibration purposes. Since float 8 rides upon the surface of the flow stream, the position of float arm 7, and therefore the rotational position of pivot shaft 6, is responsive to the depth of the water at the location of the float in the flume.

Housing 5 encloses the mechanical and electrical components of the meter transmitter. The pivot shaft 6 is supported on anti-friction bearings 19 and 20 supported by suitable structure in the housing. The arrangement and nature of the bearings are such that the shaft 6 turns readily with movement of float arm 7 and in keeping with the elevation of float 8 as it rests upon the surface of the flowing stream of water. A counterweight 10a is adjustably mounted in pivot shaft 6 by means of shaft 9 which threads into a diametral hole in pivot shaft 6, a lock nut 9a being provided to lock the counter-weight assembly in the desired position. The purpose of the adjustable counter-weight is to adjust the depth of immersion of float 8 in the water of the flowing stream. This adjustment is somewhat critical in that it is desirable that the float arm assembly have sufficient weight to follow faithfully the level of the surface of the flowing stream while, at the same time, the float is immersed no more than necessary so that floating debris will readily pass under the float. The adjustment may be made by increasing or decreasing the length of the counter-weight arm, shaft 9, by turning the counterweight assembly in the threaded hole in shaft 6. Once adjusted for a particular apparatus, particularly the float and float arm assembly, it is generally unnecessary to alter the adjustment.

In order to translate the position of the float into a usable electrical signal that may then be transmitted to suitable indicating, recording and/or control apparatus, an electrical induction coil 15, arranged within a coil housing 15a, is mounted from and within the housing by means of a suitable threaded pipe or tubing 16 and nuts threaded thereon. The electrical characteristics of this coil will be described hereinafter. The coil is mounted in vertical position and a core 10 of iron or other suitable electrical core material is arranged at its axis, being guided for vertical movement in the coil by a guiding disk 21 and connected with pivot shaft 6 through rod 14 and arm 13. The arm 13 is affixed in shaft 6 and extends radially therefrom, being coupled to vertical core rod 14 at 13a with sufficient play to permit vertical movement of the rod and core assembly following movement of arm 13 with pivot shaft 6. Desirably, a stop 11 is provided to limit movement of counter-weight arm 9, and thus rotation of pivot shaft 6 and movement of core arm 13, to avoid damage to the core operating mechanism. As shown, this stop may be part of the casting which forms housing 5. A bushing 17 provides a central opening which serves as a guide-way for core rod 14.

Electrical conductors 15b, connecting with the respective end and midpoint terminals of coil 15, may be brought out, as shown, from the middle portion of the coil housing and pass through tubular support 16 for connection with related metering apparatus.

Figure 5:
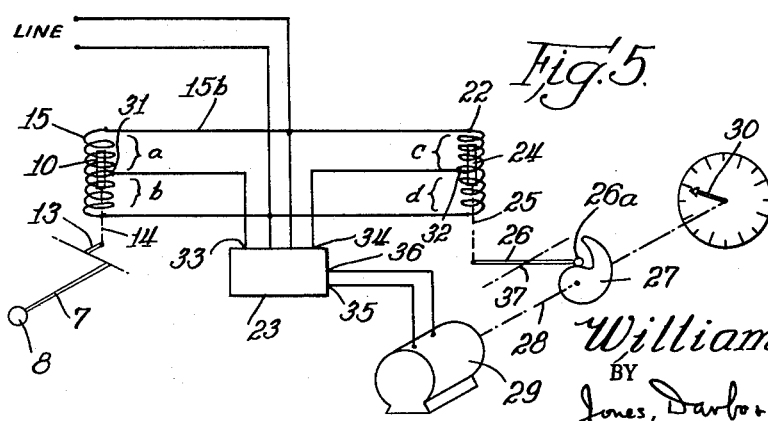
FIG. 5 is a schematic electrical wiring diagram of the transmitter, receiver, and indicating and/or recording device.
Figure 4:
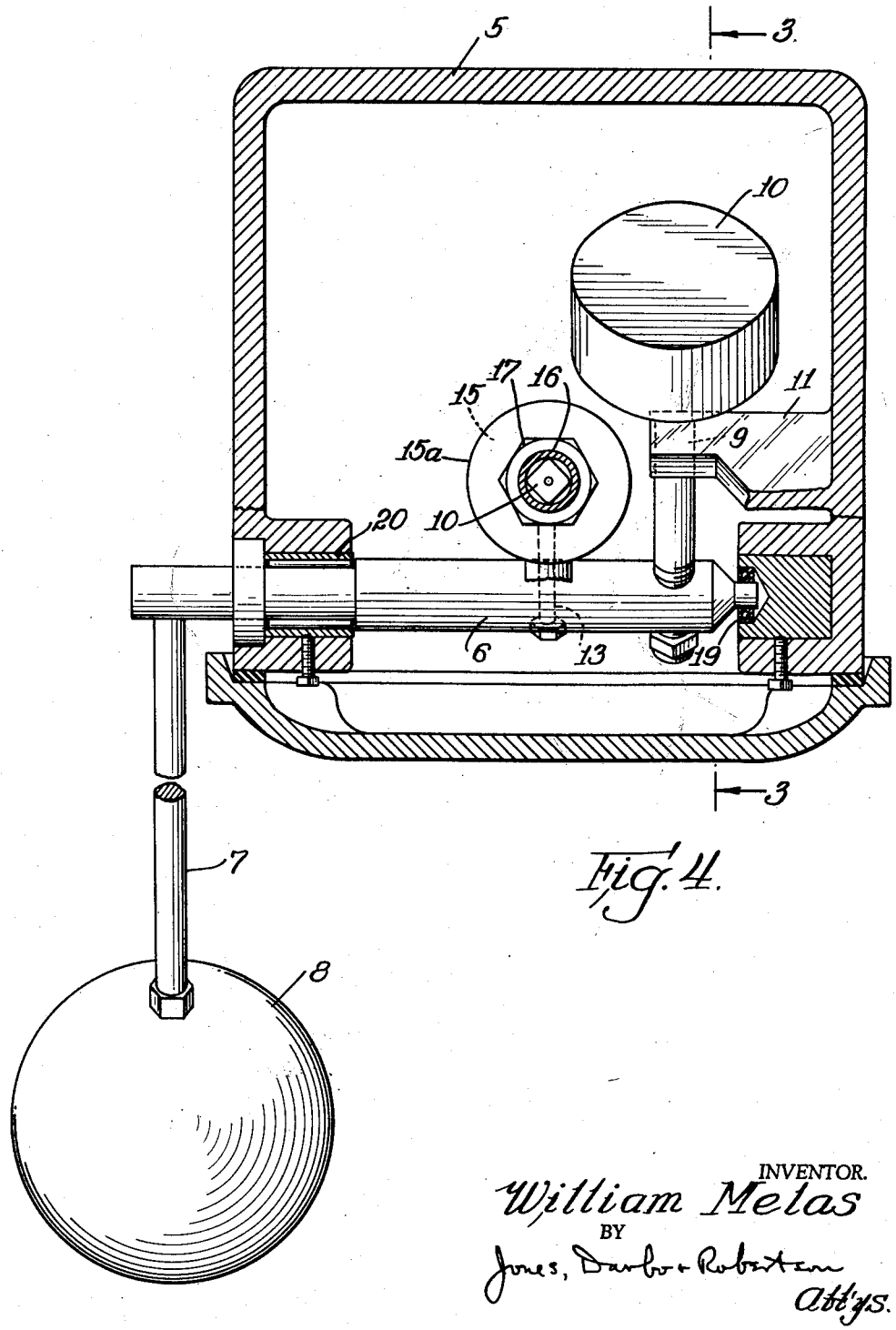
FIG. 4 is a cross-sectional view taken at the line 4—4 of FIG. 3.

A schematic wiring diagram showing the relationship of coil 15 with associated equipment is shown in FIG. 5. An alternating voltage is applied from the supply line to the respective end terminals of the transmitter coil 15 and also to the end terminals of a receiver coil 22 which may be identical to coil 15. The supply line also furnishes current for an amplifier 23. The midpoint terminals of coils 15 and 22 are respectively connected to amplifier input terminals 33 and 34. The output terminals 35 and 36 of amplifier 23 are connected to servo-motor 29 which drives a cam 27 by means of a shaft indicated at 28. The servo-motor-cam shaft may also be extended, or otherwise connected, to a meter indicator 30, or other recording or control mechanism for indicating, recording, or otherwise manifesting the rate of flow of water through the flume measuring device.

A core 24 within receiver coil 22 is mechanically coupled by means of a rod indicated at 25 with one end of cam follower arm 26 which is suitably mounted for pivoting about an axis 37 and is provided with a suitable cam follower 26a which engages cam 27.

The arrangement forms an alternating current impedance bridge consisting of legs a, b, c, and d. This bridge is employed to operate the receiving apparatus in such a way that changes in the level of the flowing stream of water or sewage are immediately reflected in the receiver. With the coils 15 and 22 energized by current from the line supply, the potential at midpoint terminal 31 of transmitter coil 15 will be equal to the potential at midpoint terminal 32 of receiver coil 22 when the impedance ratio a/b is equal to the impedance ratio c/d. This condition obtains when cores 10 and 24 are at corresponding locations within their respective coils. Input to the amplifier is then zero and actuating voltage applied to the servo-motor from amplifier output terminals 35 and 36 is also zero and the servo-motor is inactive. Any change in the level of float 8 and corresponding angular position of shaft 6 which may rotate between limiting positions indicated by the full line and dotted line positions of the counter-balance assembly in FIG. 3 results in corresponding movement of core 10 as it is driven by the float assembly, changing the impedance ratio a/b resulting in a difference in potential at terminals 31 and 32 and corresponding input to the amplifier which supplies a corresponding current to the servo-motor to turn cam 27 in a direction to alter the position of core 24 within coil 22 to that at which the impedance ratios of the respective cores again become equal so that amplifier input is reduced to zero and the servo-motor stops. In this way, changes in the level of the water are continuously manifested at the indicating mechanism 30 as the apparatus operates to continuously re-establish balance of the impedance bridge as the float assembly tends to cause a condition of unbalance.

The manner in which the apparatus is calibrated will be readily understood. The water gates at the flume may be closed to stop the flow of water therethrough and permit float 8 to rest in the depression 8b. At this position of the float assembly, indicated in dotted lines in FIG. 2, and solid line in FIG. 3, the core of the transmitter coil is at its highest position within coil 15. The receiver cam mechanism is arranged with core 24 at its uppermost position within receiver coil 2 and the indicator 30 is set at zero when the impedance bridge is balanced. The scale of the indicating or recording instrument will then depend upon the length of float arm 7 since a given change in water level will produce a greater degree of rotation of the pivot shaft 6 with a shorter arm. The length of the float arm used will depend upon the range of water levels to be measured, a greater range requiring a longer float arm to avoid appreciable error due to the movement of the float 8 in an arc about the pivot shaft. A very important advantage of the apparatus of the invention resides in its ready adaptability to an extreme range of rates of flow, nothing more being necessary than adjustment of the counterweight to properly counterbalance a longer float arm to measure a greater range of water levels. By proper choice of flume and length of float arm, it is possible to use the same transmitter apparatus to measure flows ranging from sixty gallons per minute to thirty-four thousand gallons per minute.

The greatest single advantage of the apparatus herein described resides in the elimination of the stilling well with its attendant costs and operational requirements. It is admirably suited for use in connection with a telemetering system. The spherical shape of the float is greatly to be preferred over other shapes since it has been found that floating debris, such as is encountered in the measurement of sewage, readily passes under the spherical float, especially when immersion is adjusted to about ¾ inch. The floating solids do not affect accuracy of measurement, although such debris may register as small "pips" on the chart of a recording instrument, information obtainable from the presence of such pips being itself of value for certain purposes. The housing is made watertight and no damage is caused by flooding of the flume and consequent immersion of the housing in the water. Almost no maintenance service is required by the transmitter apparatus.

Although the exemplary embodiment of the invention has been particularly described for use with Parshall flumes, such as those described in United States Department of Agriculture Circular No. 843, dated May 1950, it can be used with open flow nozzles and other types of open flow measuring devices. The flow measuring apparatus using an open flow nozzle is illustrated in FIGS. 6 and 7. The open flow nozzle 38, as such, is a well-known primary flow measurement device. As with similar devices, the rate of flow of liquid through the open flow nozzle is a function of the depth of the liquid in the nozzle. In the illustration of FIGS. 6 and 7, nozzle 38 is connected by suitable means, as flange 39, to a pipe carrying the liquid and meter housing 5 is mounted on the nozzle with the float arm 7, which is connected with the pivot shaft 6, located in the vertical axial plane of the nozzle so that float 8 rests upon the surface of the flowing liquid 8a to register the depth thereof in the manner and for the purposes hereinabove described in connection with the Parshall flume.

It may also be used for the measurement of liquid level for purposes other than rate of flow measurement.

Invention is claimed as follows:

1. Apparatus for measuring the rate of flow of a gravity flowing stream of sewage comprising a channel-type open flow measuring device including liquid level sensing apparatus operatively mounted in said flow measuring device, said liquid level sensing apparatus comprising a housing, a pivot shaft journaled in said housing for rotation about a substantially horizontal axis and having one end thereof extending outside of said housing, a float arm outside of said housing and having one end thereof fixed to said pivot shaft for movement of said float arm in a vertical plane, a float rigidly affixed to the other end of said float arm and adapted to ride upon the surface of the flowing stream of sewage as it flows through said measuring device, and means connected with said pivot shaft for indicating the elevation of said float, said housing being mounted at such a level above said measuring device and said float arm being of such length that said float arm is disposed more nearly horizontal than vertical.

2. Apparatus in accordance with claim 1 wherein the means for indicating the elevation of said float comprises an inductance coil having end and midpoint terminals, a movable core arranged at the axis of said coil, means for connecting the pivot shaft with said core whereby the position of said core within said coil is responsive to the rotational position of said pivot shaft, the arrangement being such that when the end terminals of said coil are connected to an alternating voltage the potential of said midpoint terminal is responsive to the elevation of said float.

3. Apparatus in accordance with claim 1 wherein the channel-type open flow measuring device comprises a Parshall flume and the float is located in the converging section thereof.

4. Apparatus in accordance with claim 1 wherein the channel-type open flow measuring device comprises an open flow nozzle and the float is located in the nozzle.

5. Apparatus in accordance with claim 1 wherein the float is substantially spherical.

6. Apparatus in accordance with claim 1 and including adjustable means for counter-balancing the float and float arm.

7. Apparatus in accordance with claim 6 wherein the counter-balancing means and the means for indicating the elevation of the float are contained within the housing and said housing is watertight.

8. Apparatus in accordance with claim 1 wherein the float arm is arranged substantially in line with the direction of flow of the stream of sewage as it flows through the measuring device.

9. Apparatus in accordance with claim 8 wherein the float arm is arranged with the float end downstream.

10. Apparatus for measuring the rate of flow of a gravity flowing stream of sewage comprising a channel-type open flow measuring device including liquid level sensing apparatus operatively mounted in said flow measuring device, said liquid level sensing apparatus comprising a housing, a pivot shaft journaled in said housing for rotation about a substantially horizontal axis and having one end thereof extending outside of said housing, an arm outside of said housing and having one end thereof fixed to said pivot shaft for movement of said arm in a vertical plane, means rigidly affixed to the other end of said arm and adapted to ride upon the surface of the flowing stream of sewage for elevating or lowering said other end of said arm responsive to changes in the level of the surface of the flowing stream of sewage as it flows through said measuring device, and means connected with said pivot shaft for indicating the elevation of said other end of said arm, said housing being mounted at such a level above said measuring device and said arm being of such length that said arm is disposed more nearly horizontal than vertical.

References Cited in the file of this patent

UNITED STATES PATENTS

| | | |
|---|---|---|
| 530,337 | Grover | Dec. 4, 1894 |
| 1,243,682 | Bailey | Oct. 23, 1917 |
| 1,264,115 | Moore | Apr. 23, 1918 |
| 1,630,134 | Puccioni | May 24, 1927 |
| 1,635,414 | Hirst | July 12, 1927 |
| 1,843,330 | Ledoux | Feb. 2, 1932 |
| 1,843,552 | Gibson et al. | Feb. 2, 1932 |
| 2,330,427 | Hornfeck | Sept. 28, 1943 |
| 2,359,927 | Melas | Oct. 10, 1944 |
| 2,369,027 | De Giers | Feb. 6, 1945 |
| 2,765,656 | Parshall | Oct. 9, 1956 |
| 2,903,678 | Wills | Sept. 8, 1959 |

FOREIGN PATENTS

| | | |
|---|---|---|
| 827,871 | Germany | Jan. 14, 1952 |

OTHER REFERENCES

Bulletin 62, Bailey Meter Co., Cleveland, Ohio, titled "Bailey Open Channel Meters," 12 pp. (Received in the U.S. Patent Office, Mar. 4, 1946.)

Pages 122–124 and 139–141 in Flow Measurement and Control, by W. F. Coxon, published 1959, in London by Heywood & Co., Ltd.